(12) United States Patent
Luo et al.

(10) Patent No.: US 9,007,334 B2
(45) Date of Patent: Apr. 14, 2015

(54) BASELINE CAPACITANCE CALIBRATION

(75) Inventors: Chenchi Eric Luo, Atlanta, GA (US); Milind Borkar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 202 days.

(21) Appl. No.: 13/491,186

(22) Filed: Jun. 7, 2012

(65) Prior Publication Data
US 2013/0328822 A1 Dec. 12, 2013

(51) Int. Cl.
*G06F 3/045* (2006.01)
*G06F 3/044* (2006.01)

(52) U.S. Cl.
CPC .................................... *G06F 3/044* (2013.01)

(58) Field of Classification Search
CPC ........................................................ G06F 3/044
USPC ............................ 345/173, 174; 324/678, 679
See application file for complete search history.

(56) References Cited

U.S. PATENT DOCUMENTS

| 2009/0284492 | A1* | 11/2009 | Chino | 345/174 |
| 2010/0127717 | A1* | 5/2010 | Cordeiro et al. | 324/678 |
| 2012/0092293 | A1* | 4/2012 | Ganapathi et al. | 345/174 |
| 2013/0169583 | A1* | 7/2013 | Konradi et al. | 345/174 |
| 2013/0169584 | A1* | 7/2013 | Konradi et al. | 345/174 |
| 2014/0021967 | A1* | 1/2014 | Kang et al. | 324/679 |

* cited by examiner

*Primary Examiner* — Thuy Pardo
(74) *Attorney, Agent, or Firm* — John R. Pessetto; Frank D. Cimino

(57) ABSTRACT

An embodiment of the invention provides a method of creating a statistical model of a baseline capacitance $C_P$ of a capacitive sensor located on a capacitive-touch screen. A sensed capacitance $C_S$ of a capacitive sensor is measured during a particular state of the electronic device that includes the capacitive-touch screen. When physical contact is not made with the capacitive sensor, the sensed capacitance $C_S$ is stored as a baseline capacitance $C_P$. The baseline capacitance $C_P$ is then used to create the statistical model for that particular state of the electronic device. When physical contact is made with the capacitive sensor, the value of the baseline capacitance $C_P$ of the capacitive sensor is subtracted from the value of the sensed capacitance $C_S$ and the result, $C_F=(C_S-C_P)$, is sent to a touch detection circuit.

8 Claims, 4 Drawing Sheets

AN EXAMPLE OF SPARSE NATURE OF TOUCHES

ALTERNATIVE CHARGE TRANSFER CIRCUIT

BASELINE CAPACITANCE CALIBRATION

BACKGROUND

The popularity of capacitive-touch screens has been increasing since the introduction of smart phones and tablet PCs (personal computers). Capacitive-touch screens are becoming larger in size and there is an increasing demand on the responsiveness, resolution and intelligence of these screens.

A capacitive-touch screen is usually composed of an array of capacitance sensors (also called nodes) where each capacitance sensor 100 (see FIG. 1) contains an electrical parasitic capacitance $C_P$ (referred to as baseline capacitance thereafter). Making physical contact (e.g. a finger touch) with a capacitance sensor 100 will add a second capacitance $C_F$ (referred to as foreground capacitance thereafter) in parallel with $C_P$ such that the overall sensed capacitance $C_S$ developed for a touched sensor is $C_F+C_P$. Ideally, after measurement and calibration, the foreground capacitance $C_F$ can be extracted from the sensed capacitance $C_S$ (i.e. $C_F=C_S-C_P$).

Contact with a capacitance sensor 100 can be detected when the calibrated foreground capacitance $C_F$ on specific node(s) is greater than a pre-determined threshold. Because the baseline capacitance $C_P$ of each individual capacitance sensor 100 on a capacitive-touch screen can be different from each other, the calculated foreground capacitance $C_F$ of each individual capacitance sensor 100 may be different, making it more difficult to sense when contact has been made. These differences in baseline capacitance $C_P$ may be caused, for example, by variances in the layout of the circuitry used to create a capacitance sensor or they may be caused by manufacturing variances in the process used to make a capacitive-touch screen.

In addition, the calculated foreground capacitance $C_F$ of a capacitance sensor is dependent on the operating state of the electronic device that contains a capacitive-touch screen. For example, the baseline capacitance $C_P$ can be different when a cellular phone is plugged in for charging versus when making a phone call. The capacitance $C_F$ may also change as the device ages or due to environmental effects. Other electronic device that use a capacitive-touch screen include a hand-held personal computer, a tablet personal computer, a portable personal computer, a monitor and a television.

An accurate calibration of baseline capacitance $C_P$ is useful for the accurate detection of contact made with a capacitive-touch screen.

DETAILED DESCRIPTION

The drawings and description, in general, disclose a method and apparatus of determining a statistical model of a baseline capacitance $C_P$ of a capacitive sensor located on a capacitive-touch screen of an electronic device (e.g. cellular phone). The sensed capacitance $C_S$ of the capacitive sensor is measured during a particular state of the electronic device (e.g. while a cellular phone is charging). When physical contact (e.g. a finger touching the screen) is not made with the capacitive sensor, the sensed capacitance $C_S$ is stored as a baseline capacitance $C_P$. The baseline capacitance $C_P$ is then used to create the statistical model for that particular state of the electronic device.

When physical contact is made with the capacitive sensor, the value of the baseline capacitance $C_P$ of the capacitive sensor is subtracted from the value of the sensed capacitance $C_S$ and the result $C_F=(C_S-C_P)$ is sent to a touch detection circuit. When no touch is detected, $C_F$ is used to update the model. This procedure is repeated for each capacitive sensor on the capacitive-touch screen until a statistical model of each sensed capacitance $C_S$ has been determined. The statistical model of each capacitive sensor is then used to more accurately detect when physical contact is made with a capacitive-touch screen.

Figure 1:
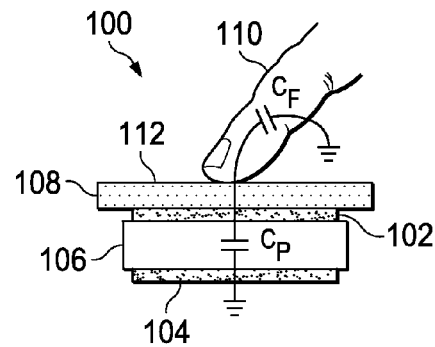
FIG. 1 is a diagram showing a cross-section of a sensor on a capacitive-touch screen along with capacitances on the capacitive-touch screen. (Prior Art)

FIG. 1 is a diagram showing a cross-section of a sensor 112 on a capacitive-touch screen 100. Two layers of indium tin dioxide (ITO) electrodes 102 and 104 are laid over an LCD screen 108. A layer of dielectric material (e.g. plastic or pyrex glass) 106 is located between the two layers of electrodes 102 and 104. The baseline capacitance $C_P$ and the foreground capacitance $C_F$ are also shown.

Figure 2:
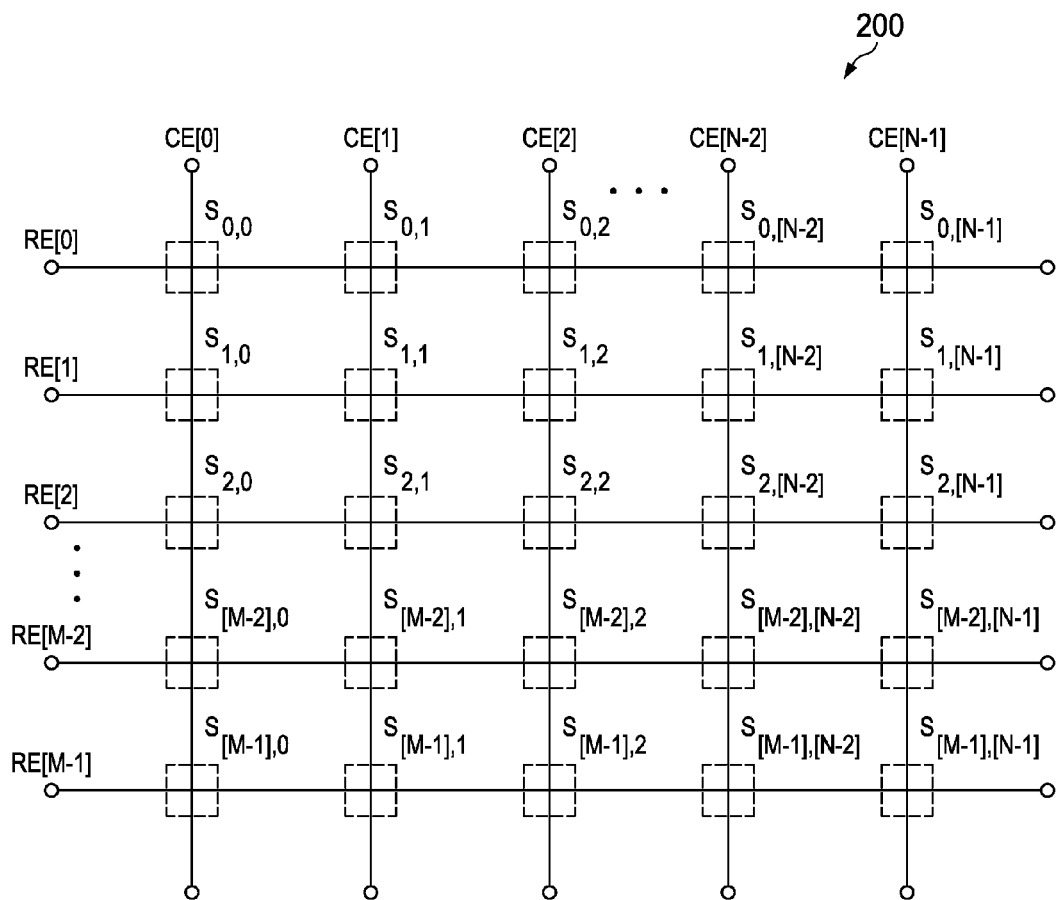
FIG. 2 is a layout of a capacitive-touch screen indicating the locations of the capacitive sensors. (Prior Art)

Consider a capacitive-touch screen as show in FIG. 2 with M row electrodes RE[0]-RE[M−1] and N column electrodes CE[0]-CE[N−1]. The capacitive-touch screen shown in FIG. 2 has M×N capacitive sensors $S_{0,0}$-$S_{[M-1],[N-1]}$ (nodes) where each sensor has a baseline capacitance $C_P$ at the intersection of each column and row electrode. The intersection of each column and row electrode is denoted with a dashed square in FIG. 2. At the intersection of column and row electrodes, electrodes are not directly connected (i.e. they are not shorted to each other). A finger 110 (other objects other than a finger may be used such as a stylus) close to a sensor shunts a portion of the electrical field to ground, which is equivalent to adding a foreground capacitance $C_F$ in parallel with $C_P$. Therefore, the sensed capacitance on the node becomes:

$$C_S = C_P + C_F \qquad \text{equ. 1)}$$

Each sensor $S_{0,0}$-$S_{[M-1],[N-1]}$ on the capacitive-touch screen 200 can be viewed as a pixel in an image. After calibrating the baseline capacitance $C_P$ out of $C_S$, the remaining foreground capacitance $C_F$ on each node effectively constitutes a two dimensional image of touches or contact made with the capacitive-touch screen 200. Touches may be detected as peaks in the image with properties such as finger size, shape, orientation and pressure as reflected in the shapes of the peaks.

Figure 3:
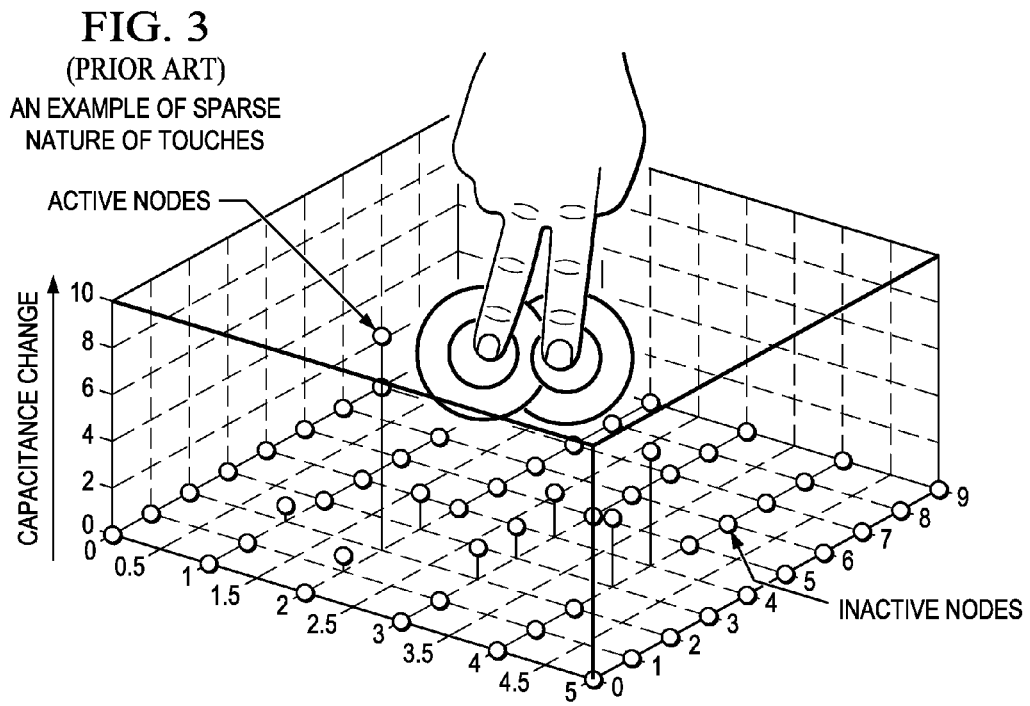
FIG. 3 is a graph of change in capacitance in a sensor as result of two fingers making contact with a capacitive-touch screen. (Prior Art)

FIG. 3 is a graph of change in capacitance on a sensor as result of two fingers making contact with a capacitive-touch screen. FIG. 3 illustrates that the capacitance of a sensor changes where contact is made with the two fingers (i.e. active nodes). In this example, the number of untouched sensors (i.e. inactive nodes) is significantly greater than the number of touched sensors (i.e. active nodes).

Figure 4A:
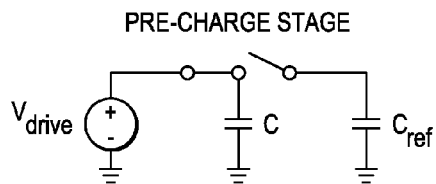
FIG. 4a is a schematic diagram of a voltage source charging a capacitor. (Prior Art)
Figure 4C:
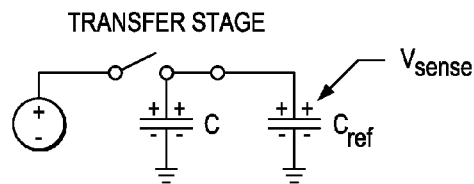
FIG. 4c is a schematic diagram of a charge being transferred from one capacitor to another capacitor. (Prior Art)
Figure 4B:
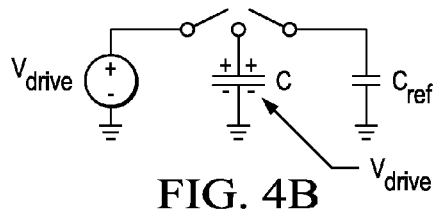
FIG. 4b is a schematic diagram of a charged capacitor and an uncharged capacitor. (Prior Art)

FIGS. 4a-4c are schematic diagrams of a charge transfer technique. As shown in FIGS. 4a-4c, charge transfer is realized in two stages: the pre-charge stage and the transfer stage. In the pre-charge stage as shown in FIG. 4a, the capacitor C is charged with a known voltage source $V_{drive}$ such that in the steady state the charge Q is equal to $Q=(V_{drive}*C)$ as shown in FIG. 4b. In the transfer stage, FIG. 4c, a reference capacitor $C_{ref}$ is connected in parallel with C such that charge on C is transferred onto $C_{ref}$. The voltage on $C_{ref}$ is $V_{sense}$. According to law of conservation of total charge, we have:

$$V_{drive}*C = V_{sense}(C+C_{ref}) \quad \text{equ. 2}$$

which can be rearranged as:

$$V_{sense} = C/(C+C_{ref})*V_{drive} \quad \text{equ. 3}$$

In this case because $C_{ref} \gg C$, we have:

$$V_{sense} = (C/C_{ref})*V_{drive} \quad \text{equ. 4}$$

Equation 4 makes it possible to estimate the capacitance of a sensor C as a proportional relationship between the drive voltage $V_{drive}$, the sense voltage $V_{sense}$ and reference capacitance $C_{ref}$. In an embodiment of the invention, this relationship is used, along with others, to determine where contact is made on a capacitive-touch screen.

Figure 5:
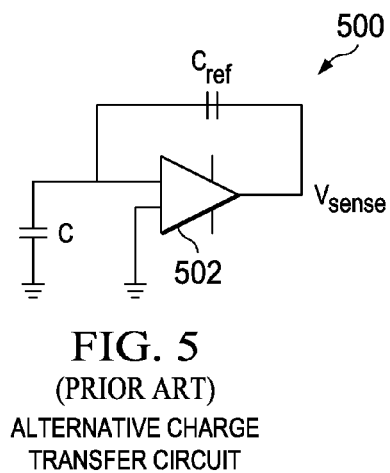
FIG. 5 is a schematic diagram of a charge transfer circuit. (Prior Art)

An alternative method for using charge transfer to determine the capacitance of a sensor is shown in FIG. 5. An operational amplifier 502 is utilized and the polarity of $V_{sense}$ is inverted. This method for using charge transfer to determine the capacitance of a sensor also provides a proportionality relationship between the drive voltage $V_{drive}$, the sense voltage $V_{sense}$ and capacitance C:

$$V_{sense} = gCV_{drive} \text{ wherein } g \text{ is a constant.} \quad \text{equ. 5}$$

Figure 6:
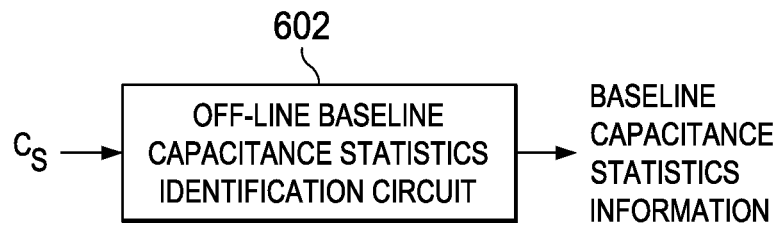
FIG. 6 is a block diagram of an off-line baseline capacitance statistics identification circuit according to an embodiment of the invention.

FIG. 6 is a block diagram of an off-line baseline capacitance statistics identification circuit according to an embodiment of the invention. In this embodiment, the off-line baseline capacitance statistics identification circuit 602 measures the sensed capacitance $C_S$ of a capacitive sensor when no physical contact is made with the capacitive sensor. Because no physical contact is made with the capacitive sensor, the sensed capacitance $C_S$ is equal to the baseline capacitance $C_P$. The value of the baseline capacitance $C_P$ is output to create baseline capacitance $C_P$ statistical information.

In this embodiment of the invention, the baseline capacitance $C_P$ statistical information is calculated for each capacitive sensor on the capacitive-touch screen. In addition, capacitance $C_P$ statistical information is calculated for each capacitive sensor for all possible states that the electronic device may operate in. For example, baseline capacitance $C_P$ statistical information of an electronic device (e.g. a cellular phone) may be determined during charging of the device. In another example, baseline capacitance $C_P$ statistical information of an electronic device (e.g. a cellular phone) may be determined during a phone call with the phone close to a human face. In a further example, baseline capacitance $C_P$ statistical information of an electronic device (e.g. a cellular phone) may be determined during a phone call where the phone is reasonably distant from a human face.

In one embodiment of the invention, the off-line baseline capacitance statistics identification circuit creates a Gaussian mixture model of the baseline capacitance $C_P$ for each individual sensor on the capacitive-touch screen. A Gaussian mixture model includes means, deviations and weights of the baseline capacitance associated with each individual sensor. However, other statistical models may be used to characterize the baseline capacitance $C_P$.

Figure 7:
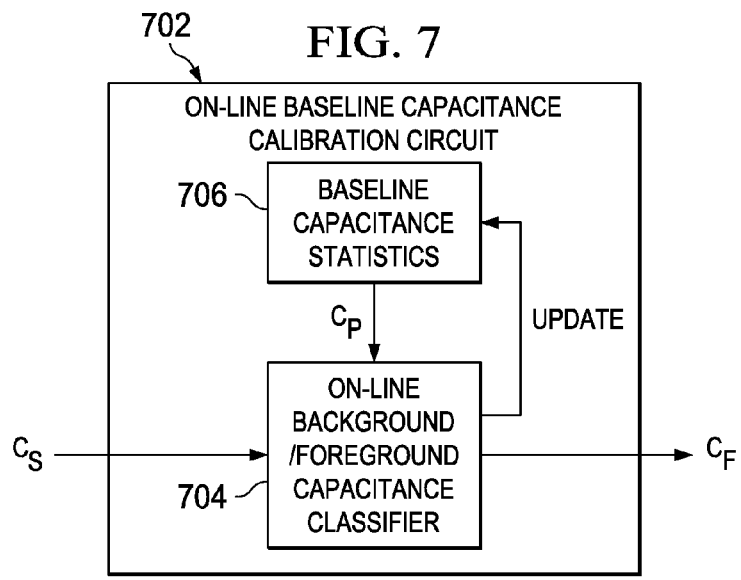
FIG. 7 is a block diagram of an on-line baseline capacitance calibration circuit according to an embodiment of the invention.

In another embodiment of the invention, an on-line baseline capacitance calibration circuit 702 as shown in FIG. 7 removes the baseline capacitance $C_P$ from the sensed capacitance $C_S$ and updates the baseline capacitance $C_P$ for each capacitive sensor. The sensed capacitance $C_S$ is compared with the baseline capacitance statistics 706 obtained from the off-line baseline capacitance statistics identification circuit 602. If the current capacitance measurement is classified as baseline capacitance $C_P$ (i.e. there is no physical contact with the capacitive sensor), the background/foreground capacitance classifier 704 will not output foreground capacitance $C_F$ to a touch-detection circuit. Instead, the current sensed capacitance $C_S$ is saved as baseline capacitance $C_P$ and the baseline capacitance statistics 706 are updated. When the sensed capacitance $C_S$ is classified as foreground capacitance $C_F$ (i.e. physical contact is made with the capacitive sensor), the foreground capacitance $C_F$ is output to a touch-detection circuit.

Figure 8:
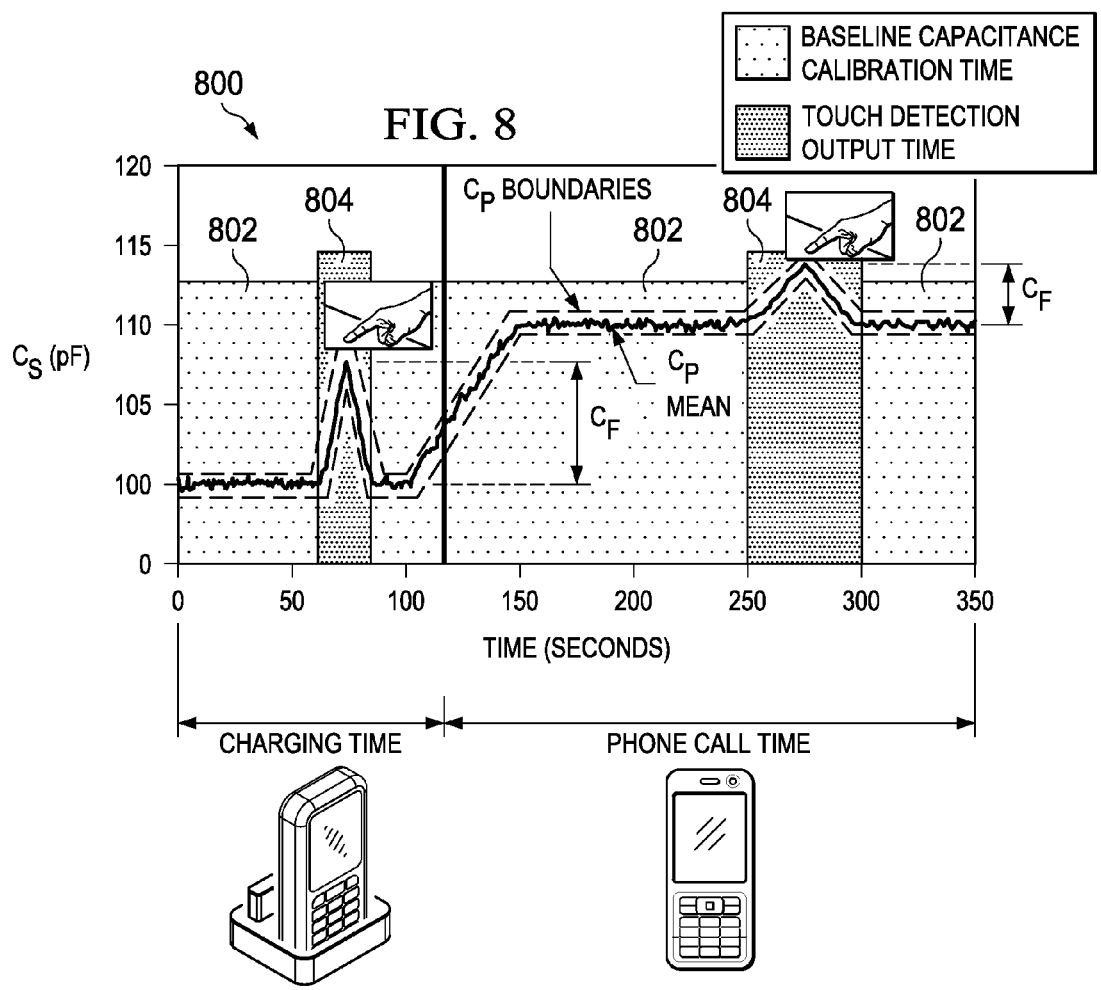
FIG. 8 is a graph of baseline capacitance $C_S$ as function of time and the state of a cellular phone according to an embodiment of the invention.

FIG. 8 is a graph of baseline capacitance $C_S$ as function of time and the state of a cellular phone according to an embodiment of the invention. In this example, a cellular phone is in the state of being charged from 0 second to approximately 120 seconds. The sensed capacitance $C_S$ is approximately 100 pico-farads (pF) when no contact 802 is made with the capacitive sensor. As a consequence, the background/foreground capacitance classifier 704 will not output foreground capacitance $C_F$ to a touch-detection circuit. Instead, the current sensed capacitance $C_S$ is saved as baseline capacitance $C_P$ and the baseline capacitance statistics 706 are updated.

When the cellular phone is in the state of being charged and physical contact 804 is made with the capacitive sensor, the sensed capacitance $C_S$ is approximately 108 pico-farads (pF) at its peak. Because physical contact is made with the capacitive sensor, the background/foreground capacitance classifier 704 will output the sensed capacitance $C_S$ as foreground capacitance $C_F$ to a touch-detection circuit. In this case the background model is not updated.

Also in this example, a cellular phone is in the state of being used to make a phone call from 120 seconds to 350 seconds. At one point during this time, the sensed capacitance $C_S$ is approximately 110 pico-farads (pF) when no contact 802 is made with the capacitive sensor. As a consequence, the background/foreground capacitance classifier 704 will not output foreground capacitance $C_F$ to the touch-detection circuit. Instead, the current sensed capacitance $C_S$ is saved as baseline capacitance $C_P$ and the baseline capacitance statistics 706 are updated.

When the cellular phone is in the state of being used to make a phone call and physical contact 804 is made with the capacitive sensor, the sensed capacitance $C_S$ is approximately 118 pico-farads (pF) at its peak. Because physical contact is made with the capacitive sensor, the background/foreground capacitance classifier 704 will output the sensed capacitance $C_S$ as foreground capacitance $C_F$ to a touch-detection circuit.

In this example, baseline capacitance $C_P$ statistics for an individual capacitive sensor are stored for each state; the charging time state and the phone call time state. As shown in FIG. 8, for each sensor, the background/foreground capacitance classifier 704 collects and updates baseline capacitance $C_P$ statistics during touch-free (i.e. no physical contact) time and stops the update when a touch is detected on that sensor. Looking from the perspective of the capacitive-touch screen, baseline capacitance calibration is undergone for those capacitive sensors that are away from the locations where contact is made and stopped for those nodes that are close to where contact is made.

Because $C_F$ is only output when contact is made, the touch detection circuit is triggered less frequently and as a result reduces power consumption on the electronic device. In addition, since this embodiment of the invention stops updating the baseline capacitance $C_S$ information when contact is made with the capacitive sensor, the capacitance induced by persistent contact will not be classified as baseline capacitance $C_P$.

Baseline capacitance $C_P$ statistics are obtained for all of the capacitive sensors on the capacitive-touch screen during these states. The statistics stored, for example, may be a Gaussian mixture model. A Gaussian mixture model includes means, deviations and weights of the baseline capacitance $C_P$ for each capacitive sensor during every state the electronic device is used in. Because statistical information may be collected for each capacitive sensor on the capacitive-touch screen during the lifetime of the electronic device, aging, operational and environmental variations in the baseline capacitance $C_P$ may accounted for in a real time manner.

Figure 9:
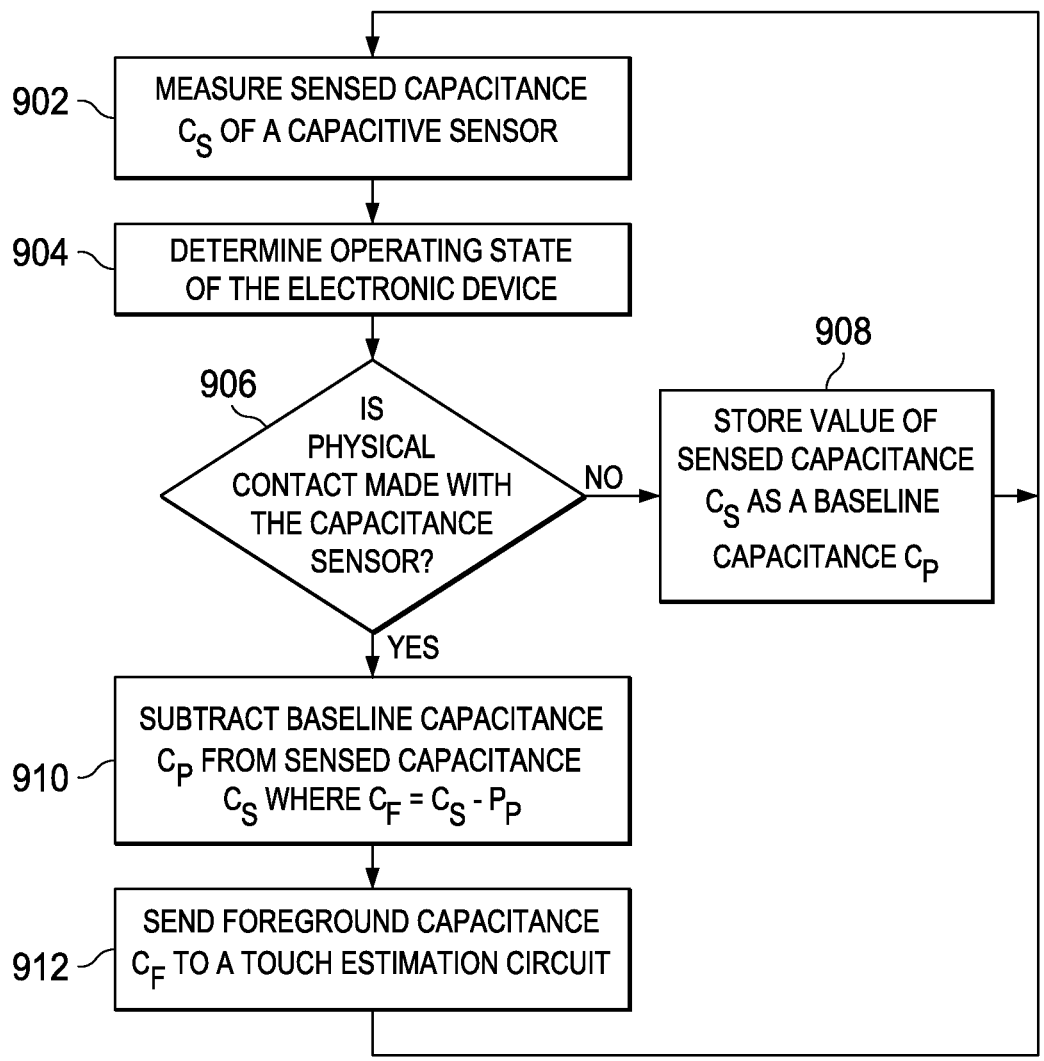
FIG. 9 is a flow chart illustrating a method of determining a statistical model of a baseline capacitance $C_P$ of a capacitive sensor on a capacitive-touch screen.

FIG. 9 is a flow chart illustrating a method of determining a statistical model of a baseline capacitance $C_P$ of a capacitive sensor on a capacitive-touch screen. In this embodiment, the sensed capacitance $C_S$ of a capacitive sensor on a capacitive-touch screen is measured 902. Next, the operating state of the electronic device (e.g. a cellular phone) is determined 904. The operating state may be when the electronic device is being charged for example or the state may be when a phone conversation is being held on the electronic device. After the state of the electronic device is determined, the method determines whether physical contact (e.g. touched) is made with a capacitive sensor 906.

When no physical contact is made with the capacitive sensor, the value of the measured sensed capacitance $C_S$ is stored as a baseline capacitance $C_P$ 908. This baseline capacitance $C_P$ is used with other previously stored baseline capacitances $C_P$ to create a statistical model of the baseline capacitance $C_P$ for a particular capacitive sensor. After the current baseline capacitance $C_P$ is stored, the method begins at the start 902 by measuring the sensed capacitance $C_S$ of the capacitive sensor or begins measuring the sensed capacitance $C_S$ of another capacitive sensor.

When physical contact is made with the capacitive sensor, the value of a baseline capacitance $C_P$ is subtracted from the measured sensed capacitance $C_S$ giving a foreground capacitance $C_F$ where $C_F=C_S-C_P$ as shown in step 910. The foreground capacitance $C_F$ is then sent to a touch detection circuit as shown in step 912. After the foreground capacitance $C_F$ is sent to the touch detection circuit, the method begins at the start 902 by measuring the sensed capacitance $C_S$ of the capacitive sensor or begins measuring the sensed capacitance $C_S$ of another capacitive sensor.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A non-transitory machine-implemented method of determining a statistical model of a baseline capacitance $C_P$ comprising:
    measuring a sensed capacitance $C_S$ of a capacitive sensor wherein the capacitive sensor is located on a capacitive-touch screen; wherein the capacitive touch screen is located on an electronic device;
    determining the state of the electronic device;
    storing the value of the sensed capacitance $C_S$ as a baseline capacitance $C_P$ based on the state of the electronic device when physical contact is not made with the capacitive sensor;
    repeating the previous steps;
    wherein the statistical model for the baseline capacitance $C_p$ is a Gaussian mixture model.

2. A non-transitory machine-implemented method of determining a statistical model of a baseline capacitance $C_P$ comprising:
    measuring a sensed capacitance $C_S$ of a capacitive sensor wherein the capacitive sensor is located on a capacitive-touch screen; wherein the capacitive touch screen is located on an electronic device;
    determining the state of the electronic device;
    storing the value of the sensed capacitance $C_S$ as a baseline capacitance $C_P$ based on the state of the electronic device when physical contact is not made with the capacitive sensor;
    repeating the previous steps;
    wherein the statistical model of a baseline capacitance $C_P$ is calculated during manufacture of the electronic device.

3. The method of claim 2 wherein the statistical model of a baseline capacitance $C_P$ is recalculated during operation of the electronic device.

4. A non-transitory machine-implemented method of creating a statistical model of a baseline capacitance $C_P$ comprising:
    measuring a sensed capacitance $C_S$ of a capacitive sensor wherein the capacitive sensor is located on a capacitive-touch screen; wherein the capacitive touch screen is located on an electronic device;
    determining the state of the electronic device;
    storing the value of the sensed capacitance $C_S$ as a baseline capacitance $C_P$ based on the state of the electronic device when physical contact is not made with the capacitive sensor;
    subtracting the value of the baseline capacitance $C_P$ of the capacitive sensor from the value of the sensed capacitance $C_S$ and sending the result $C_F=(C_S-C_P)$ to a touch detection circuit when physical contact is made with the capacitive sensor;
    repeating the previous steps;
    wherein the statistical model for the baseline capacitance $C_P$ is a Gaussian mixture model.

5. A non-transitory machine-implemented method of creating a statistical model of a baseline capacitance $C_P$ comprising:
    measuring a sensed capacitance $C_S$ of a capacitive sensor wherein the capacitive sensor is located on a capacitive-touch screen; wherein the capacitive touch screen is located on an electronic device;
    determining the state of the electronic device;

storing the value of the sensed capacitance $C_S$ as a baseline capacitance $C_P$ based on the state of the electronic device when physical contact is not made with the capacitive sensor;

subtracting the value of the baseline capacitance $C_P$ of the capacitive sensor from the value of the sensed capacitance $C_S$ and sending the result $C_F=(C_S-C_P)$ to a touch detection circuit when physical contact is made with the capacitive sensor;

repeating the previous steps;

wherein the statistical model of a baseline capacitance $C_P$ is calculated during manufacture of the electronic device.

6. The method of claim 5 wherein the statistical model of a baseline capacitance $C_P$ is recalculated during operation of the electronic device.

7. An apparatus for determining a statistical model of a baseline capacitance $C_P$ comprising:

a capacitance classifier circuit, the capacitance classifier circuit having a first input, a second input, a first output and a second output;

a baseline capacitance statistical circuit, the baseline capacitance statistical circuit having an input connected to the first output of the capacitance classifier circuit and an output connected to the second input of the capacitance classifier circuit;

wherein the value of a sensed capacitance $C_S$ of a capacitive sensor on a capacitive-touch screen on an electronic device is sensed by the first input of the capacitance classifier circuit;

wherein the state of the electronic device is determined by the capacitance classifier circuit;

wherein when no physical contact is made with the capacitive sensor, the value of the sensed capacitance $C_S$ is sent from the first output of the capacitance classifier circuit to the input of the baseline capacitance statistical circuit wherein the sensed capacitance $C_S$ is stored in the baseline capacitance statistical circuit to update the baseline capacitance $C_P$ determined during the state of the electronic device;

wherein when physical contact is made with the capacitive sensor, the value of the baseline capacitance $C_P$ of the capacitive sensor is subtracted from the value of the sensed capacitance $C_S$ and the result $C_F(C_S-C_P)$, is sent from the second output of the capacitance classifier circuit to a touch detection circuit;

wherein the statistical model for the baseline capacitance $C_P$ is a Gaussian mixture model.

8. An apparatus for determining a statistical model of a baseline capacitance $C_P$ comprising:

a capacitance classifier circuit, the capacitance classifier circuit having a first input, a second input, a first output and a second output;

a baseline capacitance statistical circuit, the baseline capacitance statistical circuit having an input connected to the first output of the capacitance classifier circuit and an output connected to the second input of the capacitance classifier circuit;

wherein the value of a sensed capacitance $C_S$ of a capacitive sensor on a capacitive-touch screen on an electronic device is sensed by the first input of the capacitance classifier circuit;

wherein the state of the electronic device is determined by the capacitance classifier circuit;

wherein when no physical contact is made with the capacitive sensor, the value of the sensed capacitance $C_S$ is sent from the first output of the capacitance classifier circuit to the input of the baseline capacitance statistical circuit wherein the sensed capacitance $C_S$ is stored in the baseline capacitance statistical circuit to update the baseline capacitance $C_P$ determined during the state of the electronic device;

wherein when physical contact is made with the capacitive sensor, the value of the baseline capacitance $C_P$ of the capacitive sensor is subtracted from the value of the sensed capacitance $C_S$ and the result $C_F(C_S-C_P)$, is sent from the second output of the capacitance classifier circuit to a touch detection circuit;

wherein the statistical model of a baseline capacitance $C_P$ is calculated during manufacture of the electronic device.

* * * * *